Figure 1:
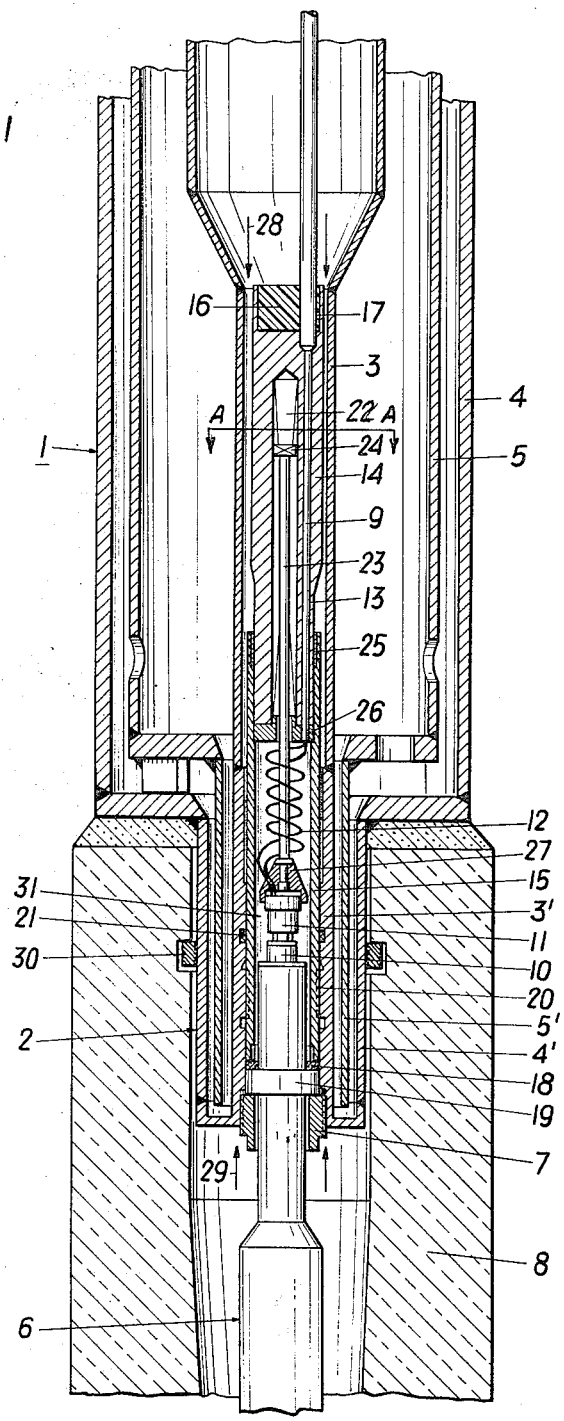

United States Patent [19]
Poferl et al.

[11] 3,780,583
[45] Dec. 25, 1973

[54] WATER-COOLED MEASURING PROBE FOR MEASURING THE TEMPERATURE OF HOT LIQUID METAL BATHS, IN PARTICULAR IN MELTING OR REFINING FURNACES

[75] Inventors: Gunter Poferl; Gerald Schmidt; Hellmuth Smejkal, all of Linz, Austria

[73] Assignee: Verinigte Osterrlichische Eisen-und Stahlwerke Aktiengesellschaft, Linz, Austria

[22] Filed: Aug. 9, 1971

[21] Appl. No.: 170,215

[30] Foreign Application Priority Data
Aug. 17, 1970  Austria.................... 7435/70

[52] U.S. Cl.............. 73/343 R, 73/359, 136/234
[51] Int. Cl. ......................................... G01k 1/14
[58] Field of Search.............. 73/343 R, 359; 136/234

[56] References Cited
UNITED STATES PATENTS

| | | | |
|---|---|---|---|
| 3,530,716 | 9/1970 | Truppe et al. | 73/343 R |
| 3,647,560 | 3/1972 | Truppe et al. | 73/359 |
| 3,647,559 | 3/1972 | Truppe et al. | 73/359 |

FOREIGN PATENTS OR APPLICATIONS

| | | | |
|---|---|---|---|
| 583,781 | 9/1959 | Canada | 73/359 |

*Primary Examiner*—Richard C. Queisser
*Assistant Examiner*—Denis E. Corr
*Attorney*—Granville M. Brumbaugh et al.

[57] ABSTRACT

The invention relates to a water-cooled measuring probe for continuously measuring the temperature of hot liquid metal baths, comprising an inner tube and an outer tube connected with each other under formation of a probe head to which a sensing portion containing a thermocouple is joined, and a plug connection for connecting a compensating line with said sensing portion; a sleeve closed at its upper end and open at its lower end surrounding the plug connection and means for sealingly pressing said sensing portion against said lower end of said sleeve. By means of this arrangement the access of water and humidity to the plug connection is absolutely avoided.

8 Claims, 3 Drawing Figures

INVENTORS.
GÜNTER POFERL, GERALD
SCHMIDT & HELLMUTH SMEJKAL
BY Brumbaugh, Graves,
Donohue & Raymond

WATER-COOLED MEASURING PROBE FOR MEASURING THE TEMPERATURE OF HOT LIQUID METAL BATHS, IN PARTICULAR IN MELTING OR REFINING FURNACES

The invention relates to a water-cooled measuring probe for continuously measuring the temperature of hot liquid metal baths, in particular in melting or refining furnaces, comprising an inner tube, an outer tube and a guiding tube between said inner and outer tubes for the formation of a cooling agent circulation, a sensing portion containing a thermocouple being releasably fixed to the head of the probe and being connectable with a compensating line ending in the probe head by means of a plug connection.

In water-cooled measuring probes which are inserted into a metal bath from above there is the problem of preventing condensing water from entering into the sensing portion which is releasably connected with the probe head. In comparatively short measuring probes with a length of some meters this problem may be solved by connecting a tube receiving the compensating line with the inner tube of the measuring probe at a certain distance above the plug connection, e.g., by means of a tension nut.

In measuring probes of great length (about 20 m) as they are used for big converters, this construction cannot be employed because owing to the fact that the water-cooled inner tube of the measuring probe and the not cooled tube receiving the compensation line are heated to a different degree, a play occurs; thus, condensing water which is always present in the inner tube may enter into the area of the plug connection where it may cause a short circuit. When the connection between the tube receiving the compensating line and the inner tube becomes leaky, the probe has to be removed. Such a defect cannot be remedied at the site during an operation pause, but the measuring probe has to be brought into the workshop where it has to be repaired.

The invention is aimed at avoiding these disadvantages and difficulties and in a probe of the kind defined in the introduction resides in that the plug connection and, if desired, part of the compensating line are surrounded by a sleeve which is closed at its upper end and open at its lower end, against whose lower end the sensing portion may sealingly be pressed and which if desired, is also sealed against the inner tube of the probe head.

Advantageously the sleeve is screwed into the inner tube of the probe head. This has the particular advantage that the sealing against the condensing water may be controlled at the site because the sleeve shaped construction element may be inserted into the inner space of the probe from below.

Suitably the sleeve is closed at its upper end by a stopper made of rubber, elastic plastics, cast resin or the like, comprsing a bore for guiding through the compensating line.

The sleeve may comprise two parts connected with each other, namely an upper part including an axial canal for receiving a guiding rod connected with the plug and an eccentrical bore arranged separately from said axial canal for receiving the compensating line, and a lower part with a hollow space above the plug for receiving a plurality of coils of the compensating line.

The axial canal has a square cross section and the guiding rod having a flange adapted to this cross section is displaceable in longitudinal direction in the canal.

The sleeve may also comprise a single structural element, in whose upper end, which is closed by the stopper, the plug or the socket of the plug connection is embedded.

In order that the invention may be more fully understood, two embodiments thereof shall now be explained with reference to the accompanying drawings.

Figure 2:
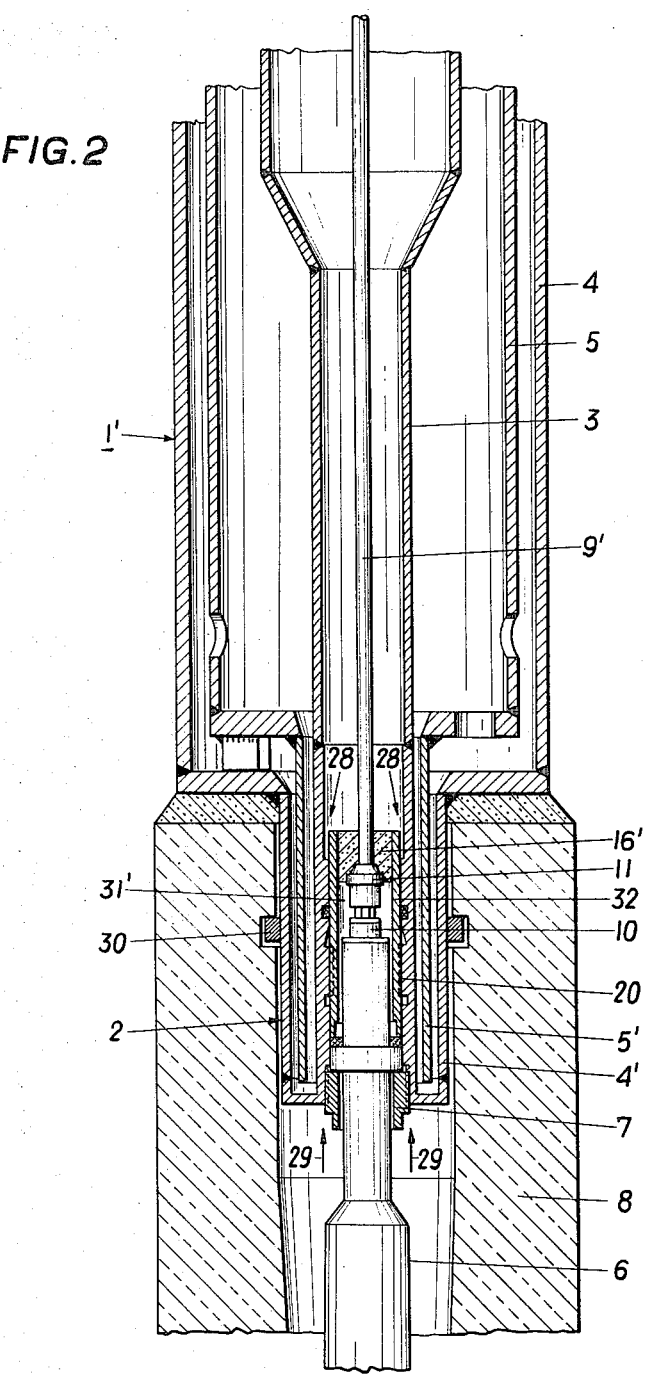
Figure 3:
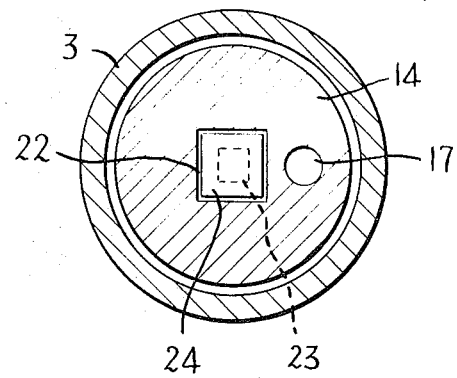

FIG. 1 shows in a partly vertical sectional view an embodiment with a sleeve comprising two parts, and FIG. 2 shows in a similar representation an embodiment comprising a sleeve in one part, FIG. 3 is a view of the embodiment of the invention taken along lines A—A in FIG. 1.

In FIG. 1 numeral 1 denotes the water-cooled probe with the probe head 2. It comprises the inner tube 3, the outer tube 4 and the guiding tube 5 arranged between the inner and the outer tubes for the formation of a coolant circulation. The probe head comprises the inner tube 3', which has the same diameter as the inner tube 3 of the probe, the outer tube 4' and the guiding tube 5'; the latter two spring in as compared to the tubes 4 and 5 like shoulders so that the probe head 2 has a smaller diameter than the probe itself. The sensing portion 6 containing the thermocouple (not illustrated) is releasably joined to the lower end of the probe head; in the embodiment according to FIG. 1 it is joined by means of a nut 7 which is screwed into the inner tube 3' of the probe head. The set back probe head 2 and the sensing portion 6 are surrounded by a refractory jacket 8. As may be seen, also in the probe head a circulation for a coolant is present which is branched off from the circulation of a cooling agent in the measuring probe. The sensing portion which is screwed into the probe head is provided at its upper end with a rapid connection for joining the thermocouple limbs to the compensating line 9; this rapid connection comprises a socket 10 and a plug 11. Above the plug connection the compensating line is laid into a plurality of coils 12, so that it is possible to remove the plug connection by pulling out the coils.

According to the invention the plug connection and part of the compensating line are surrounded by a sleeve 13 which in the embodiment according to FIG. 1 comprises two parts. It comprises the upper part 14 and the lower part 15. The upper end of the sleeve is closed by a stopper 16 which is made of rubber, elastic plastics or cast resin and which is provided with an eccentrical bore 17 through which the compensating line 9 extends. The lower end of the sleeve, which is open, is sealed by a sealing ring 18 against the flange 19 of the sensing portion 6; when the nut 7 is tightened, the sealing is pressed together. The sealing may be made of rubber, lead, copper or similar material. The lower part of the sleeve is connected by a screw connection 20 with the inner tube 3' of the probe head and sealed against it by means of the annular sealing 21.

When the sleeve comprises two parts as illustrated in FIG. 1, the upper part is advantageously provided with an axial canal 22, in which a guiding rod 23, which is connected with the plug connection 10, 11, is displaceable in longitudinal direction. This canal advantageously has a square cross section in order to prevent any torsional movements as shown in FIG. 3; the flange 24 at the upper end of the guiding rod is adapted to this cross section. The upper sleeve part 14 is connected with the lower sleeve part 15 by a screw connection or adhesive connection 25 which is gas and water tight. A floor 26 is screwed into the lower end of the sleeve part 14 which floor comprises an opening through which the guiding rod 23 extends. In this manner a sufficiently great hollow space is formed between the plug connection and the upper sleeve part for receiving a greater number of coils of the compensating line. The connection of the guiding rod with the plug connection is suitably achieved by means of a guiding body 27 of electrically insulating material.

By means of the described construction the access of water and humidity to the plug connection is absolutely avoided. It is possible that condensing water from above penetrates in the direction of the arrows 28 into the gap between the sleeve part 14 and the inner tube of the probe, but it is impossible that this water further penetrates through the sealings 16, 21 and 18. The water steam which is freed from the refractory jacket 8 and ascends in the direction of the arrows 29 likewise cannot penetrate these sealings. After the refractory jacket which is connected with the probe head by means of a bayonet catch is released, during removal and insertion of the sensing portion 6, the plug connection 10, 11 may be pulled out of the probe head 2 so far until it may be released without difficulties. By designing the guiding rod 23 and its guiding flange 24, respectively, to be square, an unintentional co-rotation of the sensing portion is avoided when the nut 7 is screwed in so that the compensating line cannot be torn. The lower part 15 of the sleeve which is connected with the inner tube 3' is cooled together with the inner tube 3' so that the space 31 surrounding the plug connection is correspondingly cooled as well.

For obtaining results of sufficient accuracy the temperature must not increase above 100° C in this space. Temperature changes which may occur in the upper part of the probe may effect an alteration in the length of the sleeve 13, but this has no influence on the function of the seals 16, 21 and 18. In particular the pressure of the flange 19 onto the sealing 18 remains constant and prevents any penetration of humidity.

In FIG. 2 the same construction elements are denoted with the same numerals as in FIG. 1. In this embodiment a sleeve 32 is employed which comprises a single part; at the upper end of this sleeve which is closed by means of a stopper 16' made of rubber or cast resin, the plug 11 is embedded which is connected with the compensating line 9'. Thus the space 31' surrounding the socket 10 and the plug 11 has a very small volume. When the sensing portion 6 is removal and insertion the plug 11 remains in the sleeve 32. When removing the sensing portion 6, after the screw connection 20 has been released, in order to be able to pull the sleeve out of the probe head 2 in downward direction to a sufficient extent it is necessary to arrange the compensating line 9' in a number of coils, not shown in the drawing, in the upper part of the probe. Also in this embodiment neither condensing water running off in downward direction as shown by the arrows 28, nor humid gas ascending upwardly as illustrated by the arrows 29 may penetrate into the plug connection.

What is claimed is:

1. A water-cooled measuring probe for continuously measuring the temperature of hot liquid metal baths by substantially vertical immersion, comprising an inner tube having an upper portion and a lower portion, an outer tube surrounding the inner tube and having an upper portion and a lower portion, a guiding tube between the inner and outer tubes providing a means for circulation of cooling water and having an upper portion and a lower portion, a probe head defined by the inner tube, outer tube and guiding tube lower portions with the outer tube connected to the inner tube at the probe bottom, a sensing portion releasably joined to the probe head and containing a thermocouple, a compensating line ending in the probe head, a plug connection for connecting the compensating line with the sensing portion, a sleeve within the inner tube with the plug connection within the sleeve, the sleeve closed at its upper end and open at its lower end, and means for sealingly pressing the sensing portion against the lower end of the sleeve to enclose the plug connection within the sleeve.

2. The measuring probe set forth in claim 1, wherein the sleeve also encloses part of the compensating line.

3. The measuring probe set forth in claim 1, wherein the sleeve is sealed against the inner tube of the probe head.

4. The measuring probe set forth in claim 1, wherein the sleeve is screwed into the inner tube lower portion of the probe head.

5. A water-cooled measuring probe for continuously measuring the temperature of hot liquid metal baths by substantially vertical immersion, comprising an inner tube having an upper portion and a lower portion, an outer tube surrounding the inner tube and having an upper portion and a lower portion, a guiding tube between the inner and outer tube providing a means for circulation of cooling water and having an upper portion and a lower portion, a probe head defined by the inner tube, outer tube and guiding tube lower portions with the outer tube connected to the inner tube at the probe bottom, a sensing portion releasably joined to the probe head and containing a thermocouple, a compensating line ending in the probe head, a plug connection for connecting the compensating line with the sensing portion, a guiding rod, a sleeve within the inner tube with the plug connection within the sleeve, the sleeve having an upper part connected to a lower part and closed at its upper end and open at its lower end, the upper part including an axial canal for receiving said guiding rod connected with the plug and an eccentrically arranged bore separate from the axial canal for receiving the compensating line, the lower part providing a hollow space above the plug for receiving a plurality of coils of the compensating line, and means for sealingly pressing the sensing portion against the lower end of the sleeve to enclose the plug connection within the sleeve.

6. The measuring probe set forth in claim 5, wherein the axial canal has a square cross-section and the guiding rod includes a flange adapted to the cross-section to limit rotation of the guiding rod, the flange being longitudinally displacable in the canal.

7. A water cooled measuring probe for continuously measuring the temperature of hot liquid metal baths by substantially vertical immersion, comprising an inner tube having an upper portion and a lower portion, an outer tube surrounding the inner tube and having an upper portion and a lower portion, a guiding tube between the inner tube and outer tube providing a means for circulation of cooling water and having an upper portion and a lower portion, a probe head defined by the inner tube, outer tube and guiding tube lower portions with the outer tube connected to the inner tube at the probe bottom, a sensing portion releasably joined to the probe head and containing a thermocouple, a compensating line ending in the probe head, a plug connection for connecting the compensating line with the sensing portion, a sleeve within the inner tube with the plug connection within the sleeve, the sleeve closed at its upper end and open at its lower end, a stopper adapted to be inserted in the upper end of the sleeve to form a tight fit and made of a material selected from the group consisting of rubber, elastic plastic, and cast resin, the stopper having a bore for the compensating line to pass through, and means for sealingly pressing the sensing portion against the lower end of the sleeve to enclose the plug connection within the sleeve.

8. A water cooled measuring probe for continuously measuring the temperature of hot liquid metal baths by substantially vertical immersion, comprising an inner tube having an upper portion and a lower portion, an outer tube surrounding the inner tube and having an upper and a lower portion, a guiding tube between the inner and outer tubes providing a means for circulation of cooling water and having an upper portion and a lower portion, a probe head defined by the inner tube, outer tube and guiding tube lower portions with the outer tube connected to the inner tube at the probe bottom, a sensing portion releasably joined to the probe head and containing a thermocouple, a compensating line ending in the probe head, a plug connection for connecting the compensating line with the sensing portion, a sleeve within the inner tube formed of a single constuctional element with the plug connection within the sleeve, the sleeve having its upper end closed by a stopper embedding a part of the plug connection and having its lower end open, and means for sealingly pressing the sensing portion against the lower end of the sleeve to enclose the plug connection within the sleeve.

* * * * *

PO-1050
(5/69)

UNITED STATES PATENT OFFICE
CERTIFICATE OF CORRECTION

Patent No. 3,780,583          Dated Dec. 25, 1973

Inventor(s) Poferl et al.

It is certified that error appears in the above-identified patent and that said Letters Patent are hereby corrected as shown below:

First page, Item [73], "Verinigte Osterrlichische Eisen-und" should be --Vereinigte Österreichische Eisen- und--;

Col. 1, line 57, "comprsing" should read --comprising--; and

Col. 3, lines 51 and 52, "removal and insertion" should read --removed or inserted--.

Signed and sealed this 21st day of May 1974.

(SEAL)
Attest:

EDWARD M. FLETCHER, JR.          C. MARSHALL DANN
Attesting Officer          Commissioner of Patents